(12) United States Patent
Wang et al.

(10) Patent No.: US 12,421,964 B2
(45) Date of Patent: Sep. 23, 2025

(54) ELECTRIC OIL PUMP

(71) Applicant: HANGZHOU QUADRANT TECHNOLOGY CO., LTD., Zhejiang (CN)

(72) Inventors: Liping Wang, Zhejiang (CN); Guojun Zhang, Zhejiang (CN); Ruinan Wang, Zhejiang (CN); Hezhao Hua, Zhejiang (CN); Yi Zhao, Zhejiang (CN); Zhixue Lu, Zhejiang (CN)

(73) Assignee: HANGZHOU QUADRANT TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/801,900

(22) Filed: Aug. 13, 2024

(65) Prior Publication Data
US 2025/0059972 A1    Feb. 20, 2025

(30) Foreign Application Priority Data

Aug. 17, 2023 (CN) .......................... 202311034365.1
Nov. 29, 2023 (CN) .......................... 202311608228.4

(51) Int. Cl.
*F04C 2/10* (2006.01)
*F01P 5/12* (2006.01)
(Continued)

(52) U.S. Cl.
CPC ................ *F04C 2/102* (2013.01); *F01P 5/12* (2013.01); *F04C 2/10* (2013.01); *F04C 2/103* (2013.01);
(Continued)

(58) Field of Classification Search
CPC .. F04C 2/103; F04C 2/10; F04C 11/00; F04C 29/04; F04C 2240/40; F04C 2240/30; F04C 2240/50
See application file for complete search history.

(56) References Cited

U.S. PATENT DOCUMENTS 7,614,227 B2 * 11/2009 Carlson ............... F16H 61/4035
                                                                                                        60/487
8,376,720 B2    2/2013   Rosalik, Jr.
(Continued)

FOREIGN PATENT DOCUMENTS

JP      S58184377 U    12/1983
JP      H02277983 A    11/1990
(Continued)

OTHER PUBLICATIONS

Non-Final Office Action received in corresponding U.S. Appl. No. 18/638,892, dated Jun. 7, 2024, 8 pages.
(Continued)

*Primary Examiner* — Connor J Tremarche
(74) *Attorney, Agent, or Firm* — Cooper Legal Group, LLC

(57) ABSTRACT

An electric oil pump, including a pump housing, a fixed shaft in the pump housing, an inner gear eccentrically and rotatably connected to the fixed shaft, an outer gear coaxially connected to the fixed shaft and rotatably arranged in the pump housing, the outer gear is located at an outer periphery of the inner gear and engaged with the inner gear, a motor rotor fixedly connected to an outer periphery of the outer gear, and a motor stator at an outer periphery of the motor rotor, the motor stator is fixedly connected to the pump housing. A projection area of the motor stator, a projection area of the motor rotor, a projection area of the outer gear, a projection area of the inner gear and a projection area of (Continued)

the fixed shaft on a plane through an axis of the fixed shaft at least partially overlap.

11 Claims, 12 Drawing Sheets

(51) Int. Cl.
    *F04C 11/00*         (2006.01)
    *F04C 29/02*         (2006.01)
    *F04C 29/04*         (2006.01)
    *H02K 9/19*          (2006.01)
    *F01P 3/00*          (2006.01)

(52) U.S. Cl.
    CPC ......... *F04C 11/008* (2013.01); *F04C 29/023* (2013.01); *F04C 29/04* (2013.01); *H02K 9/19* (2013.01); *F01P 2003/006* (2013.01); *F01P 2005/125* (2013.01); *F04C 2240/30* (2013.01); *F04C 2240/40* (2013.01); *F04C 2240/50* (2013.01)

(56) References Cited

U.S. PATENT DOCUMENTS

| | | | |
|---|---|---|---|
| 11,959,481 | B2 | 4/2024 | Rosinski et al. |
| 2002/0136657 | A1* | 9/2002 | Ewald ............... F04C 11/00 418/196 |
| 2005/0186089 | A1 | 8/2005 | Nakayoshi et al. |
| 2007/0231176 | A1 | 10/2007 | Asai et al. |
| 2009/0175751 | A1* | 7/2009 | Nakayoshi ......... F04C 15/0042 310/58 |
| 2011/0129364 | A1 | 6/2011 | Yamamori et al. |
| 2013/0052058 | A1* | 2/2013 | Motohashi .............. F01C 21/02 417/410.4 |
| 2014/0154125 | A1 | 6/2014 | Blechschmidt |
| 2023/0296094 | A1 | 9/2023 | Rosinski et al. |

FOREIGN PATENT DOCUMENTS

| | | |
|---|---|---|
| JP | 2005273648 A | 10/2005 |
| JP | 2006177291 A | 7/2006 |
| JP | 2009156081 A | 7/2009 |
| JP | 2009162146 A | 7/2009 |
| JP | 2013500430 A | 1/2013 |
| JP | 2021508362 A | 3/2021 |
| JP | 2022539958 A | 9/2022 |
| JP | 2023502630 A | 1/2023 |
| KR | 20230024800 A | 2/2023 |

OTHER PUBLICATIONS

Non-Final Office Action received in corresponding U.S. Appl. No. 18/801,947, dated Oct. 7, 2024, 25 pages.
Office Action received in corresponding Japanese Patent Application No. 2024-137467, dated Nov. 12, 2024, 10 pages.
Final Office Action received in corresponding U.S. Appl. No. 18/801,947, dated Jan. 29, 2025, 27 pages.
Second Office Action received in corresponding Japanese Patent Application No. 2024-137466, dated Apr. 22, 2025, 14 pages.
Second Office Action received in corresponding Japanese Patent Application No. 2024-137467, dated Apr. 22, 2025, 15 pages.
Non-Final Office Action received in corresponding U.S. Appl. No. 18/801,947, dated May 14, 2025, 15 pages.
First Office Action received in corresponding German patent application No. 10 2024 207 805.0, dated Apr. 29, 2025, 14 pages.

* cited by examiner

ELECTRIC OIL PUMP

CROSS-REFERENCE TO RELATED APPLICATION

This application claims the priority to Chinese patent application serial no. 202311034365.1, filed on Aug. 17, 2023, and Chinese patent application serial no. 202311608228.4, filed on Nov. 29, 2023. The entireties of Chinese patent application serial no. 202311034365.1 and Chinese patent application serial no. 202311608228.4 are hereby incorporated by reference herein and made a part of this specification.

TECHNICAL FIELD

The present application relates to the technical field of electric oil pumps for new energy vehicles, and, in particular, to an electric oil pump with low resistance and high stability.

BACKGROUND ART

With the rapid development of automobile electronization and new energy vehicles, electric oil pumps, which have an integrated design and high precision, are increasingly used because of their high efficiency, energy conservation and flexible control.

At present, an electric oil pump mainly includes three parts: a gerotor, a motor, a controller and other components. The motor is controlled by the controller to work and drive the gerotor to rotate, so as to realize the operation of the electric oil pump.

However, conventional electric oil pumps have the disadvantages of complex structure, large size, high resistance and low stability, so there is still a lot of room for improvement.

SUMMARY

An object of the present application is to provide an electric oil pump, which has the advantages of compact structure, small size, low resistance, good stability, high working efficiency, and the like.

The present application provides an electric oil pump, including a pump housing and further including a fixed shaft in the pump housing; an inner gear eccentrically and rotatably connected to the fixed shaft; an outer gear coaxially connected to the fixed shaft and rotatably arranged in the pump housing, wherein the outer gear is located at an outer periphery of the inner gear and engaged with the inner gear; a motor rotor fixedly connected to an outer periphery of the outer gear; and a motor stator at an outer periphery of the motor rotor, wherein the motor stator is fixedly connected to the pump housing. A projection area of the motor stator, a projection area of the motor rotor, a projection area of the outer gear, a projection area of the inner gear and a projection area of the fixed shaft on a plane through an axis of the fixed shaft at least partially overlap with each other.

By adopting the technical solution described above, the outer gear is arranged inside and integrally formed with the motor rotor. The following technical effects may be achieved by such a design. Firstly, the height of the electric oil pump is reduced, such that the system size is significantly reduced, the system weight is decreased, and the material and production costs of the system are significantly reduced. Secondly, the height of the electric oil pump is reduced, and the flowing path of the pressurized cooling oil is shortened, which effectively reduces the friction with the chamber of gerotor, thereby being conductive to improving the efficiency of the system. Thirdly, the structure is simple, which reduces the accumulated installation errors, such that the coaxiality of the motor rotor, the motor stator and the outer gear is improved, so as to effectively avoid the hidden risk of air gap eccentricity. Fourthly, the structure is more stable, which effectively reduces the working vibration and noise of the pump body, thereby improving the performance and reliability of the pump body, and extending the service life of the pump body.

In some embodiments, a first bearing is further included, the outer gear is rotatably connected to a first end of the fixed shaft via the first bearing, and a second end of the fixed shaft is connected to the pump housing.

In some embodiments, a second bearing is further included, a first end of the fixed shaft is rotatably connected to the pump housing via the second bearing, a second end of the fixed shaft is coaxially connected to the outer gear.

The installation of the fixed shaft and the pump housing is conventionally implemented by designing a step at the bottom of the pump housing, where a stationary end of the fixed shaft passes through the step to be in threaded connection with a nut. The nut abuts against an end face of the step, so as to generate a friction force between the nut and the step, achieving the fixed connection between the fixed shaft and the pump housing. However, the tightness of nut installation will affect the axial end clearance of the pump body. In the working state, when the temperature inside the pump housing rises, different thermal expansion coefficients of materials of the pump housing, the fixed shaft and the nut (such as the aluminum material of the pump housing, the stainless steel material of the fixed shaft, and the steel material of the nut) would cause the change in the axial end clearance, thereby affecting the performance of the pump body. By adopting the technical solution described, the bearing is directly connected to the fixed shaft, thereby reducing the aspect ratio of the electric oil pump. Since the large-diameter bearing has a large aspect ratio with the rotary shaft, the electric oil pump has poor structural stability, which results in a poor concentricity of the motor and the pump gears relative to the rotary shaft when the electric oil pump works. Many advantages can be achieved by installing a small-sized bearing at the bottom of the rotary shaft. For example, the structure system of the pump body presents a smaller aspect ratio, the structure of the pump body is more stable, and the concentricity of the motor, the pump gears and the rotary shaft may be effectively improved. Further, the structure of the gerotor is significantly simplified, and the assembly difficulty of the rotary shaft and the pump housing is significantly simplified, which is conducive to ensuring the concentricity of the structure of the pump system, and helps to improve the accuracy of the air gap between the motor stator and the motor rotor, so that the motor always works in a precise and uniform magnetic field distribution, the motor works more stably, the magnetic field of the motor is utilized more efficiently, so as to ultimately ensure the efficient operation of the electric oil pump. In addition, the accumulation of assembly deviations caused by multiple contact interfaces is reduced, which effectively reduces the friction resistance generated when the pump structure rotates. The problem of larger eccentricity caused by the rotation of the large-sized bearing can be ameliorated, the influence of thermal expansion of different materials caused by temperature on the axial and radial end clearances of the pump body is reduced, thereby improving the efficiency and stability of the electric oil pump.

In some embodiments, the electric oil pump further includes an eccentric calibrator between the fixed shaft and the inner gear, the eccentric calibrator is configured as a crescent sleeve on an outer circumference wall of the fixed shaft, the crescent sleeve is configured with a curved notch for insertion fitting with the fixed shaft, and the crescent sleeve is configured to allow the inner gear to be eccentrically and rotatably connected to the fixed shaft.

By adopting the technical solution described above, with the eccentric calibrator, the concentricity deviations of multiple parts such as the pump housing, the fixed shaft and the motor caused by machining and assembly may be compensated, thereby effectively ensuring the concentricity of the pump housing, the fixed shaft and the motor. When the outer gear is rotatably connected with the fixed shaft, the eccentric assembly may be rotatably connected to the inner gear, thus achieving the relative coaxial and eccentric arrangement of the inner gear relative to the outer gear. Moreover, since the fixed shaft and the pump housing are arranged concentrically, the motor rotor may be arranged with high concentricity with the fixed shaft and the pump housing via the fixed shaft, thereby effectively compensating for insufficient concentricity accuracy caused by tolerance accumulation due to machining and assembly. A circumferential side wall of the fixed shaft is partially embedded in the curved notch, so that the circumferential side wall of the fixed shaft and an outer circumference wall of the crescent sleeve form the eccentric assembly rotatably connected to the inner gear, thereby achieving the relative coaxial and eccentric arrangement of the inner gear relative to the outer gear, which effectively compensates for insufficient eccentricity between the center and the axis of the motor caused by tolerance accumulation due to machining and assembly, and also maintains the mutual drive of the inner and outer gears of the gerotor based on the eccentricity design.

In some embodiments, a bushing is further included, and the inner gear is rotatably connected to the crescent sleeve and the fixed shaft via the bushing.

By adopting the technical solution described above, the friction between the inner gear and the fixed shaft and between the inner gear and the crescent sleeve may be reduced through the bushing, thereby reducing the friction resistance and improving the rotation efficiency.

In some embodiments, a plurality of intake-expulsion chambers are formed between the outer gear and the inner gear, and volume of the intake-expulsion chamber firstly increases gradually and then decreases gradually along a rotation direction of the outer gear. The pump housing is provided with an inlet and an outlet. When the volume of the intake-expulsion chamber increases gradually, an open end of the intake-expulsion chamber is aligned with the inlet, and when the volume of the intake-expulsion chamber decreases gradually, the open end of the intake-expulsion chamber is aligned with the outlet.

In some embodiments, when the volume of the plurality of intake-expulsion chambers increases gradually, the cooling oil flows into the plurality of intake-expulsion chambers through the inlet, and when the volume of the plurality of intake-expulsion chambers decreases gradually, the cooling oil in the plurality of intake-expulsion chambers is pressed out of the outlet.

In the above technical solution, the inner circumferential wall of the outer gear, the outer circumference of the motor rotor, and the inner gear are combined to form multiple intake-expulsion chambers. When the inner gear and the outer gear are rotated relative to each other, the intake-expulsion chamber gradually increases in size and sucks in oil through the inlet. The amount of oil in the intake-expulsion chamber increases with the volume of the intake-expulsion chamber. During the suck-in process, due to the contact of the oil having a relatively low temperature with the teeth of the inner gear and the outer gear, the oil absorbs the heat from the teeth. When the intake-expulsion chamber gradually decreases in size, the oil in the intake-expulsion chamber is discharged through the outlet, so that the amount of oil in the intake-expulsion chamber decreases as the volume of the intake-expulsion chamber decreases. The oil with higher temperature after absorbing heat during the suck-in process is discharged from the outlet, achieving cooling and lubrication of the inner gear and the outer gear, and, in turn, cooling of the pump body, and ensuring the working temperature and efficiency of the pump.

In some embodiments, a circuit control module is further included. The circuit control module includes a controller and a busbar hub, the controller and the busbar hub are arranged in the pump housing, the motor stator is arranged on the busbar hub, the motor stator is provided with a plurality of stator coils along a circumferential direction of the motor stator, the motor rotor is sleeved on an outer circumference of the outer gear, and an outer circumference wall of the motor rotor is opposite an inner circumference wall of the motor stator.

By adopting the technical solution disclosed above, the controller controls the busbar hub to power the plurality of stator coils on the motor stator, the plurality of stator coils after being powered on generate a magnetic field, which interacts with the permanent magnetic field of the rotor magnet, to drive the motor rotor to rotate. The motor stator interacts with the rotor magnet, to drive the outer gear of the gerotor of the motor rotor to rotate, because the motor rotor is integrated in the outer rotor of the gerotor, the outer gear of the gerotor of the rotor in turn drives the inner gear to rotate, thus realizing the relative rotation of the outer gear relative to the inner gear.

In some embodiments, an O-ring is provided at an outer periphery of the pump housing.

In the described technical solution, the O-ring is deformable horizontally and axially, which is conductive to sealing to reduce oil leakage and to form high pressure. This design has the advantages of cost saving, high efficient, easiness to assemble, long service life and convenience to maintain.

To sum up, the present application may achieve at least one of the following beneficial technical effects.

1. In the present application, the height of the electric oil pump is reduced, such that the system size, the system weight and in turn the cost are reduced. The structure is simple, such that the assembly precision and the working efficiency are high, which extends the service life of the product.

2. In some embodiments of the present application, the electric oil pump presents a smaller aspect ratio, the structure of the pump body is more stable, and the concentricity of the motor, the pump gears and the rotary shaft may be effectively improved. By this design, the structure of the gerotor is significantly simplified, the assembly difficulty of the rotary shaft and the pump housing is significantly simplified, which is conducive to ensuring the concentricity of the structure of the pump system, and helps to improve the accuracy of the air gap between the motor stator and the motor rotor, so that the motor always works in a precise and uniform magnetic field distribution, the motor works more stably, the magnetic field of the motor is utilized more efficiently, so as to ultimately ensure the efficient operation of the electric oil pump.

3. In a case where the second bearing is used, the size of the bearing is reduced and as a result, the area of the contact interfaces of the bearing with the outer gear of the gerotor and the pump housing is reduced, the accumulation of assembly deviations caused by multiple contact interfaces is reduced, which reduces effectively the friction resistance generated when the pump structure rotates. In addition, large eccentricity caused by the rotation of a large-sized bearing is reduced, and the efficiency and stability of the electric oil pump are improved.

4. By provision of the second bearing, the bottom of the rotary shaft is fixed to the pump housing as a whole, and the upper part of the shaft is directly connected to a top cover of the outer gear, thereby ensuring the precise end clearance and radial clearance of the pump body, avoiding the thermal expansion effect caused by different temperature coefficients of different materials of different parts when the temperature changes. Moreover, by provision of the second bearing, the structure of the electric oil pump is more stable, thereby effectively reducing the working vibration and noise of the pump body, improving the NVH (Noise, Vibration, Harshness) performance and reliability of the pump body, and extending the service life of the pump body.

DETAILED DESCRIPTION

Figure 1:
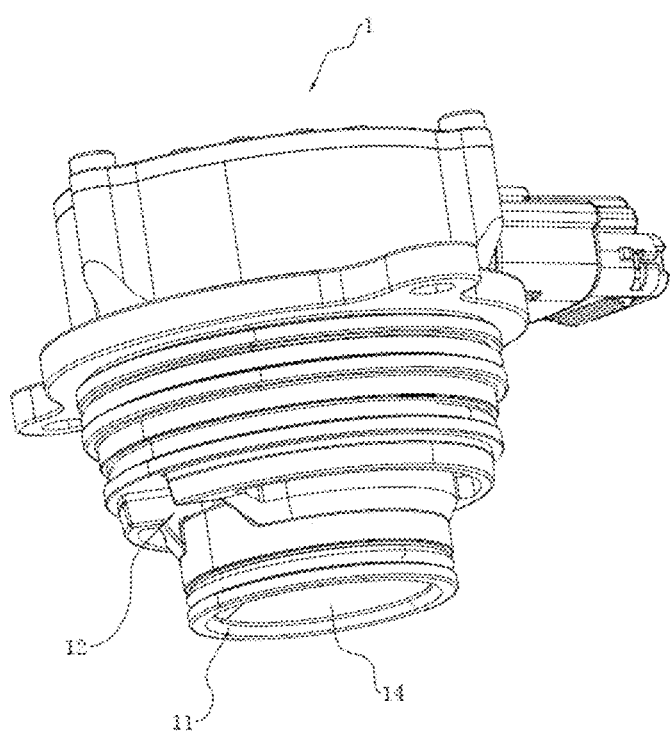
FIG. 1 is a schematic diagram showing the appearance structure of an electric oil pump according to a first embodiment of the present application.

In order to make the object, technical solutions and advantages of the present application more clear, it will be described in detail below with reference to the accompanying drawings. The assemblies in embodiments of the present application, which are typically described and illustrated in the drawings herein, may be arranged and designed in a variety of different configurations. All other embodiments obtained by a person of ordinary skilled in the art based on the embodiments of the present disclosure without creative efforts shall fall within the protection scope of the present disclosure.

It should be noted that similar reference numerals and letters denote similar items in the following accompanying drawings, and therefore, once an item is defined in a drawing, it is not necessary to further define and explain it in the following accompanying drawings.

In the description of the present disclosure, it should be noted that, unless otherwise clearly specified and defined, the terms "install", "connecting", and "connected" should be understood in a broad sense, for example, it may be a fixed connection, a detachable connection, or an integral connection, it may be a mechanical connection or an electrical connection, and it may be a direct connection, an indirect connection through an intermediate medium, or an inner connection of two elements. For those skilled in the art, the specific meanings of the above terms in the present disclosure could be understood according to a specific condition.

In the description of the present disclosure, it should be understood that the orientation or position relationship indicated by the terms "upper", "lower", left", "right", etc. are based on the orientation or position relationship shown in the accompanying drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

The embodiments of the present application will be described below in further detail with reference to the accompanying drawings. In the case of no conflict, the features in the following embodiments may be combined with each other The First Embodiment Referring to FIGS. 1-5, this embodiment discloses an electric oil pump. Referring to FIG. 1, the electric oil pump includes a pump housing 1. In some embodiments, the pump housing 1 is made of aluminum. An outlet 12 is defined in a side wall of the pump housing 1, an inlet 11 is defined at the bottom of the pump housing 1. The bottom of the pump housing 1 is provided with a filter screen 14, which is located at the inlet 11 to cover the inlet 11.

Figure 2:
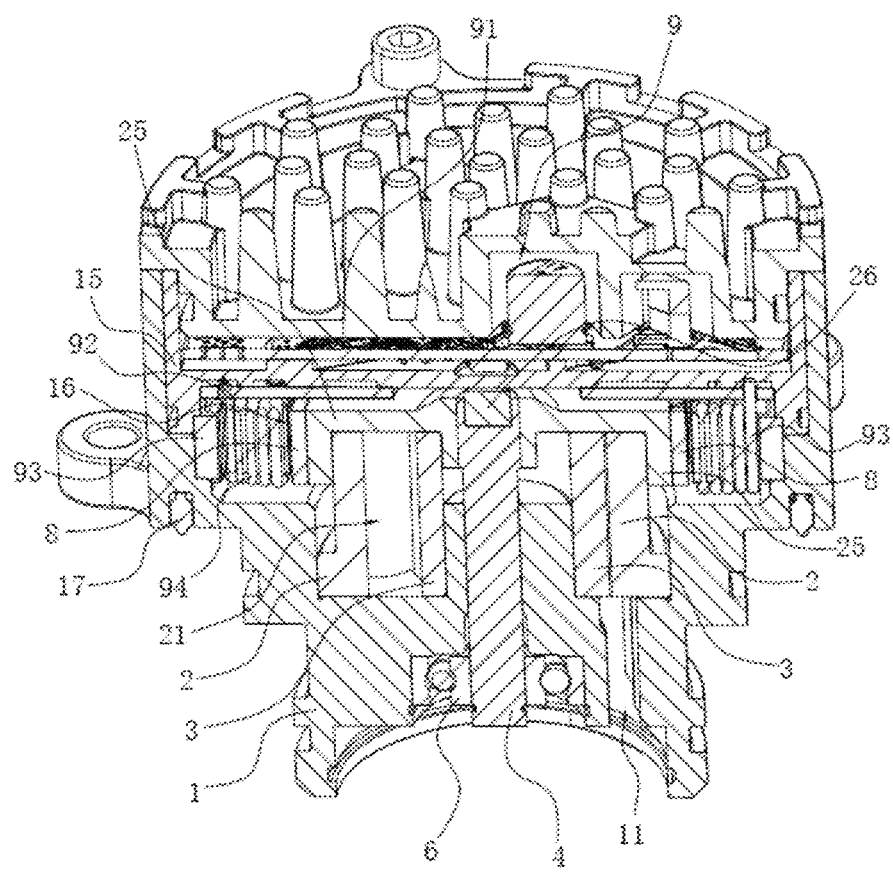
FIG. 2 is a schematic three-dimensional section view of the electric oil pump according to the first embodiment of the present application.
Figure 3:
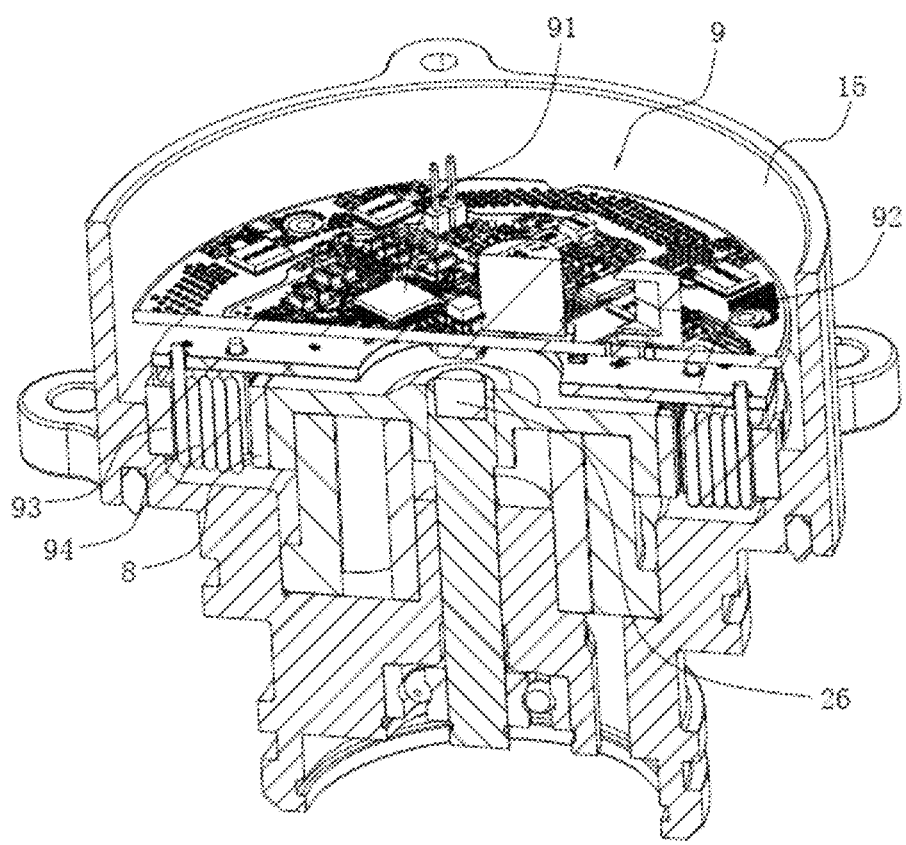
FIG. 3 is a section view showing the internal structure of the electric oil pump according to the first embodiment of the present application.
Figure 4:
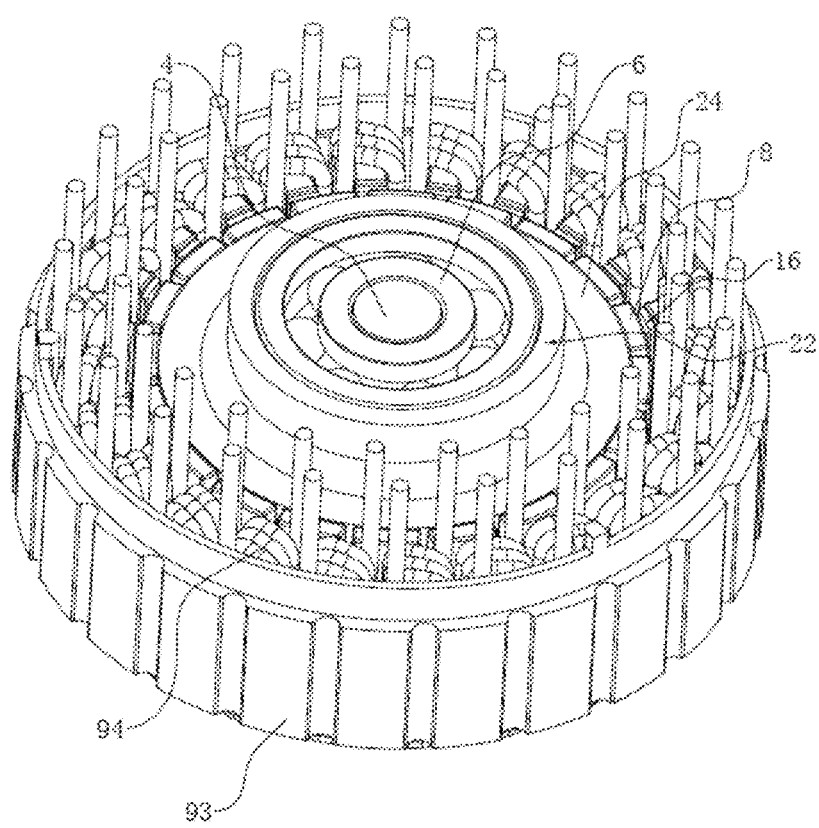
FIG. 4 is a schematic structural diagram of a motor stator in the electric oil pump according to the first embodiment of the present application.

Referring to FIGS. 2-4, a fixed shaft 4, a motor, a circuit control module 9 and a gear set are installed in the pump housing 1. The motor includes a motor rotor 8, a motor stator 93 and a stator winding 94. The motor stator 93 is fixed in the pump housing 1, the motor rotor 8 is arranged in the motor stator 93, and a plurality of stator coils 94 are wound around the motor stator 93 circumferentially, located between the motor rotor 8 and the motor stator 93.

The gear set includes an outer gear 2 that is integrated in and fixed to the motor rotor 8 and an inner gear 3 that is located in the outer gear 2 and engaged with the inner teeth of the outer gear 2. The inner gear 3 is eccentrically and rotatably connected to the fixed shaft 4, in which "eccentrically" means that the rotation axes do not coincide. The outer gear 2 is coaxially connected to the fixed shaft 4 and rotatably arranged in the pump housing 1. In the present disclosure, the outer gear 2 is integrated into the motor rotor 8, which are pressed into a whole. On the one hand, this design significantly reduces the volume of the system, reduces the weight of the system, and reduces the material and production costs of the system obviously. On the other hand, this design effectively reduces the friction of the chamber of gerotor, which is conducive to improving the efficiency of the system.

The pump housing 1 is provided with an enclosure 15 for separating the controller 91 from the busbar hub 92. With the enclosure 15, the oil paths may be separated from the electric control part, thereby improving the sealing effect and ensuring the work of the controller 91 at a suitable temperature. A PTC temperature sensor (not shown) for detecting and feeding back the temperature of the cooling oil is installed on the enclosure 15 and electrically connected to the controller 91. In some embodiments, the detection of the PTC temperature sensor may be accurate to 0.1° C.

The outer gear is integrated in the motor rotor and the thermal expansion coefficients of the motor stator 93 and the pump body are identical, which greatly reduces the influence of temperature on the clearances of the oil pump, so as to precisely ensure the end clearance of the pump, such that the influence of temperature on the flow efficiency of the system is effectively reduced or avoided.

During operation, the circuit control module 9 controls a plurality of stator windings 94 to be powered on to generate a magnetic field, which interacts with the permanent magnetic field of a magnet of the motor rotor 8, to drive the motor rotor 8 to rotate. The motor rotor 8 is fixed to the outer gear 2, that is, the motor stator 93 and the magnet of the motor rotor 8 interact with each other to drive the outer gear 2 to rotate, and the outer gear 2 in turn drives the inner gear 3 to rotate, thus realizing the relative rotation of the inner gear 3 relative to the outer gear 2.

In particular, projection areas of the motor stator 93, of the motor rotor 8, of the outer gear 2, of the inner gear 3 and of the fixed shaft 4 on a plane through the axis of the fixed shaft 4 at least partially overlap with each other. With the present structure, the axial height of the electric oil pump may be reduced, so as to attain a compact structure and a small size.

A sealing ring is further provided at an outer periphery of the pump housing 1. In some embodiments, the sealing ring is an O-ring and made of rubber. The O-ring 17 is configured for horizontal and axial deformation, which is conducive to sealing to reduce oil leakage and to form high pressure. This design is cost-effective and efficient, easy to assemble, has a long service life and is easy to maintain.

In some embodiments, the electric oil pump further includes an upper cover 25 fixedly connected to the outer gear 2. One end of the fixed shaft 4 is rotatably connected to the pump housing 1 via a bearing 6, and the other end of the fixed shaft 4 is coaxially and fixedly connected to the outer gear 2 through the upper cover 25. The inner gear 3 is eccentrically connected to the fixed shaft 4 through the pump housing 1, and the inner gear 3 is rotatably connected to the pump housing 1.

For the cold start of the high-power electric oil pump, the top of the fixed shaft 4 is also fixedly connected with a sensor 26 in this embodiment, for example, a magnetic transformer. In other embodiments, the sensor 26 may also be fixedly connected to the upper cover 25 fixedly connected to the outer gear 2.

The circuit control module 9 includes a busbar hub 92 above the motor in the pump housing 1 and a controller 91 above the busbar hub 92. The function of the busbar hub 92 is to collect the incoming and outgoing lines of the stator winding 94, so that the line ends are distributed orderly and clearly, and the line ends are welded on the busbar hub 92 by a simple and clean process. Another function of the busbar hub 92 is to separate the controller 91 from the motor part, so that the oil only circulates in the motor part to form a cooling and lubrication loop, thereby preventing the oil from entering the controller 91.

The busbar hub 92 is arranged above the stator assembly. Pins of the stator windings 94 are inserted in the busbar hub 92, thereby simplifying the design of the electric control module and thus the traditional winding structure.

The controller 91 may allow a fast response, which is characterized in a circuit reverse connection protection, prevention of signal interference, monitoring of oil temperature, prevention of overheating, independent communication channels, detection of the angular position of the motor, reception and calculation of the motor speed, and rational comparison and adjustment of the actual rotor speed.

Since the height of the whole electric oil pump is reduced, compared with a traditional electric oil pump, a short time for the pressurized cooling oil to flow to the stator assembly is required by the electric oil pump in this embodiment, thereby achieving a better cooling effect.

Referring to FIG. 2, the working process of the electric oil pump is as follows: the controller 91 controls the busbar hub 92 to power the plurality of stator windings 94 on the motor stator 93, the plurality of stator windings 94 after being powered on generate a magnetic field, to drive the motor rotor 8 to rotate, the motor stator 93 drives the outer gear 2 to rotate, thus realizing the relative rotation of the outer gear 2 relative to the inner gear 3.

When the inner gear 3 rotates relative to the outer gear 2, the volume of the intake-expulsion chamber 21 increases gradually, the oil is taken in through the inlet 11, so the amount of oil in the intake-expulsion chamber 21 increases as the volume increases. In this case, the oil with a low temperature comes into contact with the teeth of the inner gear 3 and the outer gear 2 during the intake of the oil, such that the oil absorbs the heat of the teeth. Then, the oil is discharged through the outlet 12 as the volume of the intake-expulsion chamber 21 decreases gradually, such that the amount of oil in the intake-expulsion chamber 21 decreases as the volume decreases. In this case, the oil with a high temperature after absorbing heat during the intake of the oil is discharged out of the pump body from the outlet 12, thereby realizing the cooling and lubrication of the inner gear 3 and the outer gear 2 while cooling the pump body.

Figure 5:
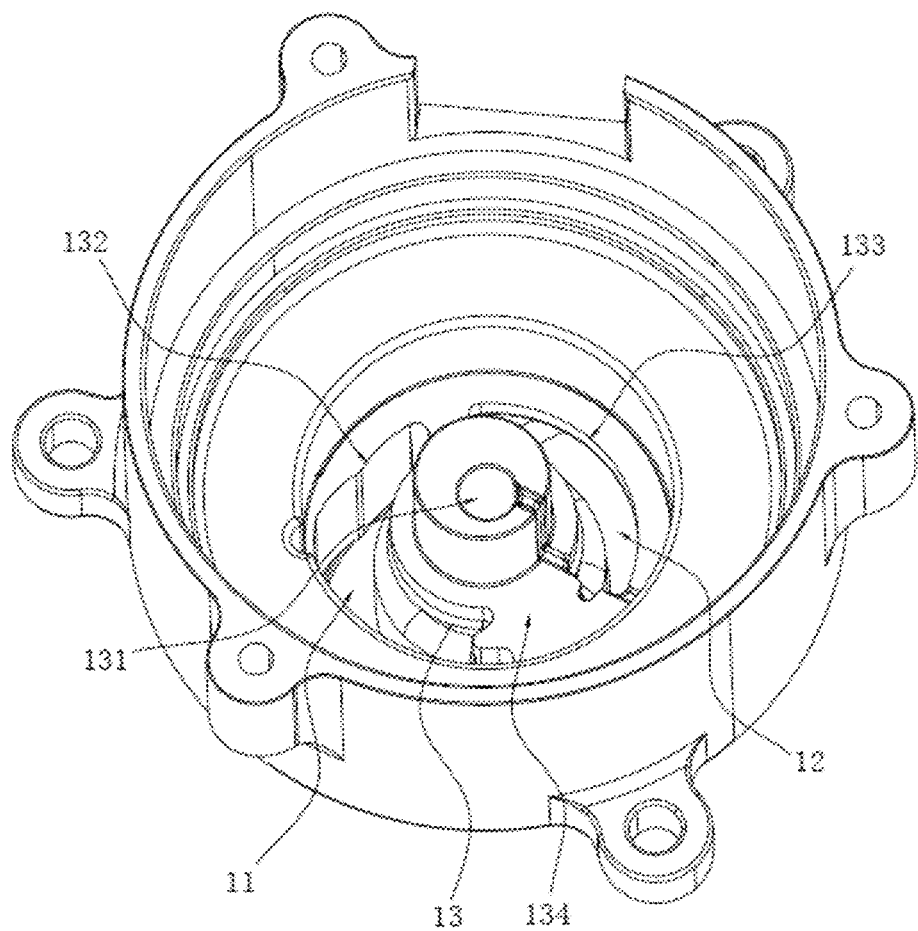
FIG. 5 is a schematic structural diagram of a pump housing in the electric oil pump according to the first embodiment of the present application.

Referring to FIG. 5, the bottom of the pump housing 1 is integrally formed with a housing bottom 13 configured to cover the inlet 11 and the outlet 12. The housing bottom is configured with a pressing hole 131, and the pressing hole 131 is eccentrically arranged relative to the pump housing 1. The fixed shaft 4 is arranged in the pressing hole 131, and an outer circumference wall of the fixed shaft 4 is in tight fit with a hole wall of the pressing hole 131. A sliding bearing may be arranged between the inner gear 3 and the pump housing 1 to reduce the rotation resistance and increase the service life. The end surface of the housing bottom 13 is configured with an intake mouth 132 in communication with the inlet 11 and an expulsion mouth 133 in communication with the outlet 12. A partition 134 for separating the intake mouth 132 from the expulsion mouth 133 is provided at the housing bottom 13, and one side of the partition 134 abuts against one side of the inner gear 3, which improves the sealing effect between the intake mouth 132 and the expulsion mouth 133.

In this embodiment, the eccentric fit between the inner gear 3 and the outer gear 2 is achieved via the eccentric pressing hole 131 of the pump housing without any redundant accessories. The advantages of this design lie in that the structure of the gerotor is simplified and the assembly difficulty of the rotary shaft and the pump housing is lowered. The concentricity of the motor, the housing and the gear set is improved, which is conducive to ensuring the structure concentricity of the pump system. With this design, the accuracy of the air gap between the motor stator and the motor rotor may be improved, so that the motor always works in a precise and uniform magnetic field distribution. The motor works more stably and more precisely, the magnetic field of the motor is unitized more efficiently, so as to ultimately ensure the efficient operation of the electric oil pump. The accumulation of assembly deviations caused by multiple contact interfaces is reduced, which effectively reduces the friction resistance generated when the pump structure rotates. The large eccentricity caused by the rotation of a large-sized bearing is reduced, which improves the efficiency and stability of the electric oil pump. This design has a small size, light weight and is cost-efficient.

The Second Embodiment

Referring to FIGS. 6-11, this embodiment differs from the first embodiment in the eccentric connection structure of the fixed shaft 4.

Figure 6:
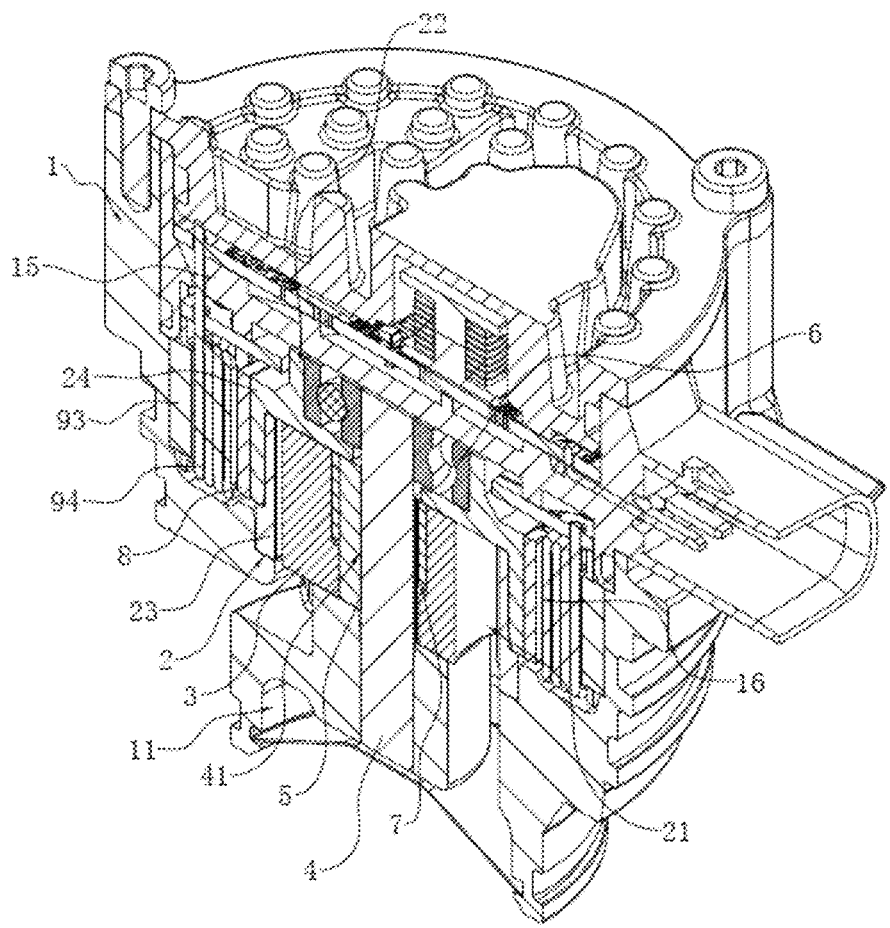
FIG. 6 is a schematic three-dimensional cross section of an electric oil pump according to a second embodiment of the present application.
Figure 7:
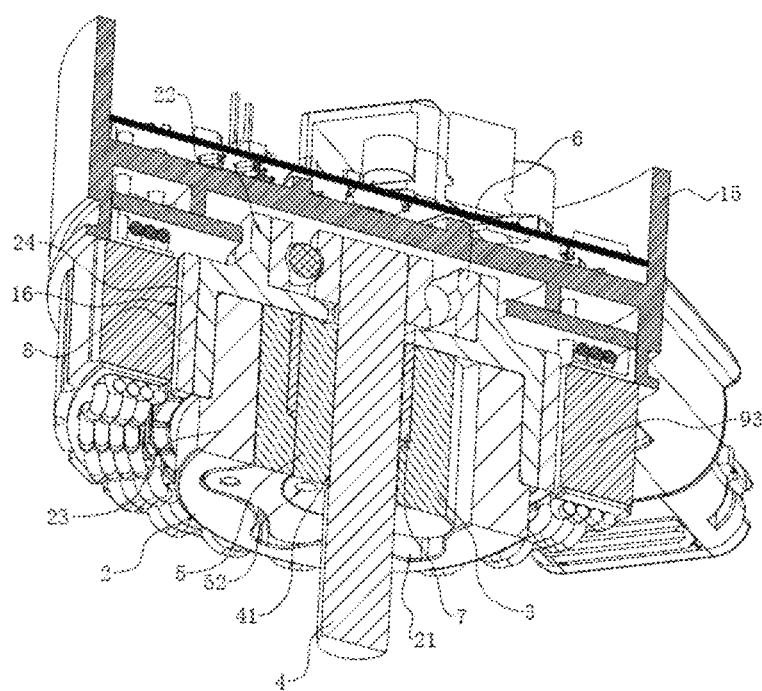
FIG. 7 is a schematic structural diagram showing the circuit control module, the outer gear and the inner gear in the electric oil pump according to the second embodiment of the present application.
Figure 8:
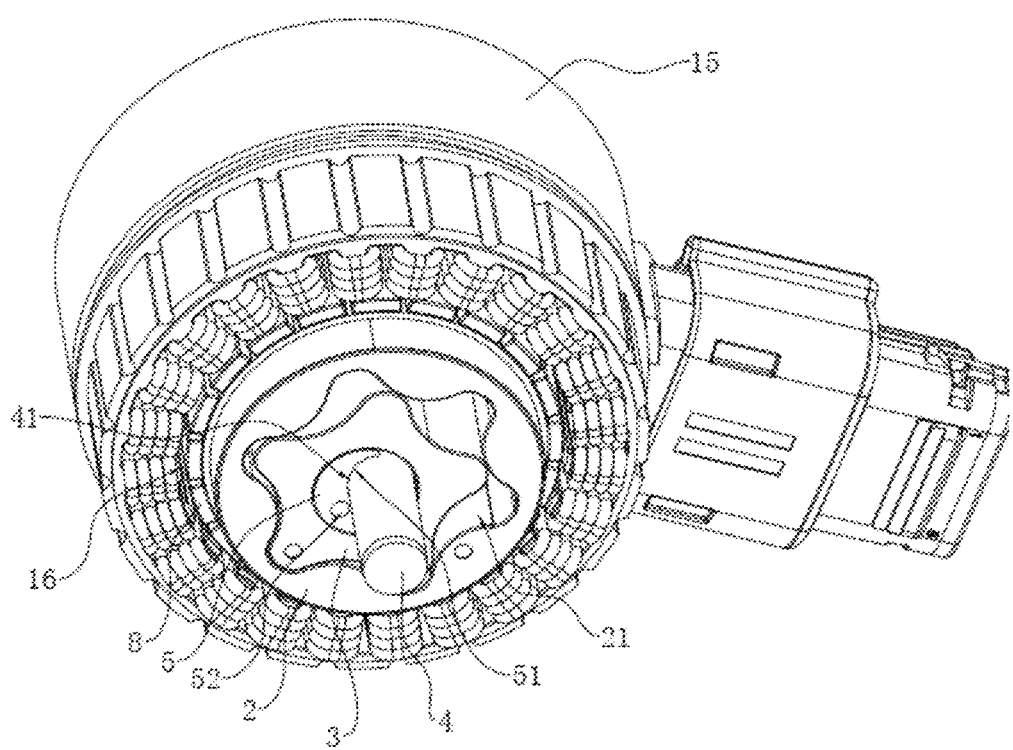
FIG. 8 is a schematic structural diagram showing the assembly of the motor stator, the inner gear and the outer gear in the electric oil pump according to the second embodiment of the present application.

Referring to FIGS. 6-8, the outer gear 2 in this embodiment includes an inner circumference of outer gear 23, which is engaged with the inner gear 3, and the inner circumference of the motor rotor is fixedly sleeved on the outer circumference of the outer gear. A permanent magnet of the motor rotor 8 is fixed at an outer periphery of the outer circumference of motor rotor 24, and an air gap 16 is formed between the permanent magnet of the motor rotor 8 and the stator windings 94. For the purpose of research and development process, the influence of various factors on the stability of the clear width of the air gap 16 shall be minimized. A rotor neck 22 is integrally formed at the top of the outer circumference of motor rotor 24, and a bearing 6 is installed in the rotor neck 22. The bearing 6 is configured to support the motor rotor 8, to ensure the rotation of the outer gear 2 in the gerotor. The bearing 6 is installed at an end of the gerotor, so that there is no chamber between the motor and the gerotor, thereby reducing the height of the electric oil pump, which significantly reduces the weight and size of the gerotor. In this embodiment, the bearing 6 and the pump housing 1 are machined by a same mechanical fixture, so that the bearing 6 and the pump housing 1 have very precise coaxiality and concentricity, so as to precisely control the air gap eccentricity.

Referring to FIGS. 6-9, the bottom of the pump housing 1 is configured with a pressing hole 131, and the pressing hole 131 and the pump housing 1 are arranged concentrically. The fixed shaft 4 is inserted into the pressing hole 131, and the fixed shaft 4 is in tight fit with the bearing 6. The rotor neck 22 that matches the bearing 6 is integrally formed on one side of the outer gear 2. The inner gear includes an inner circumference of inner gear that is in coaxial fit with the fixed shaft 4 and abuts against the eccentric assembly. The inner gear 3 is eccentrically and rotatably connected to the fixed shaft 4 via an eccentric calibrator 5. "Eccentrically" means that the rotation axes do not coincide. The eccentric calibrator 5 is configured as a crescent sleeve disposed on an outer circumference wall of the fixed shaft 4. The crescent sleeve is configured with a curved notch 51 for the fixed shaft 4 to be embedded. The crescent sleeve is configured to allow the inner gear 3 to be eccentrically and rotatably connected to the fixed shaft 4. The inner circumference of motor rotor is configured to axially abut against the outer circumference of outer gear. The rotor neck 22 that matches the bearing 6 is integrally formed on one side of the outer circumference of motor rotor 24. The rotor neck 22 and one side of the outer circumference of motor rotor 24 form a rabbet for the bearing 6 to be embedded. The outer circumference wall of the bearing 6 is in tight fit with the circumferential groove wall of the rabbet, so as to reduce the working noise.

Figure 9:
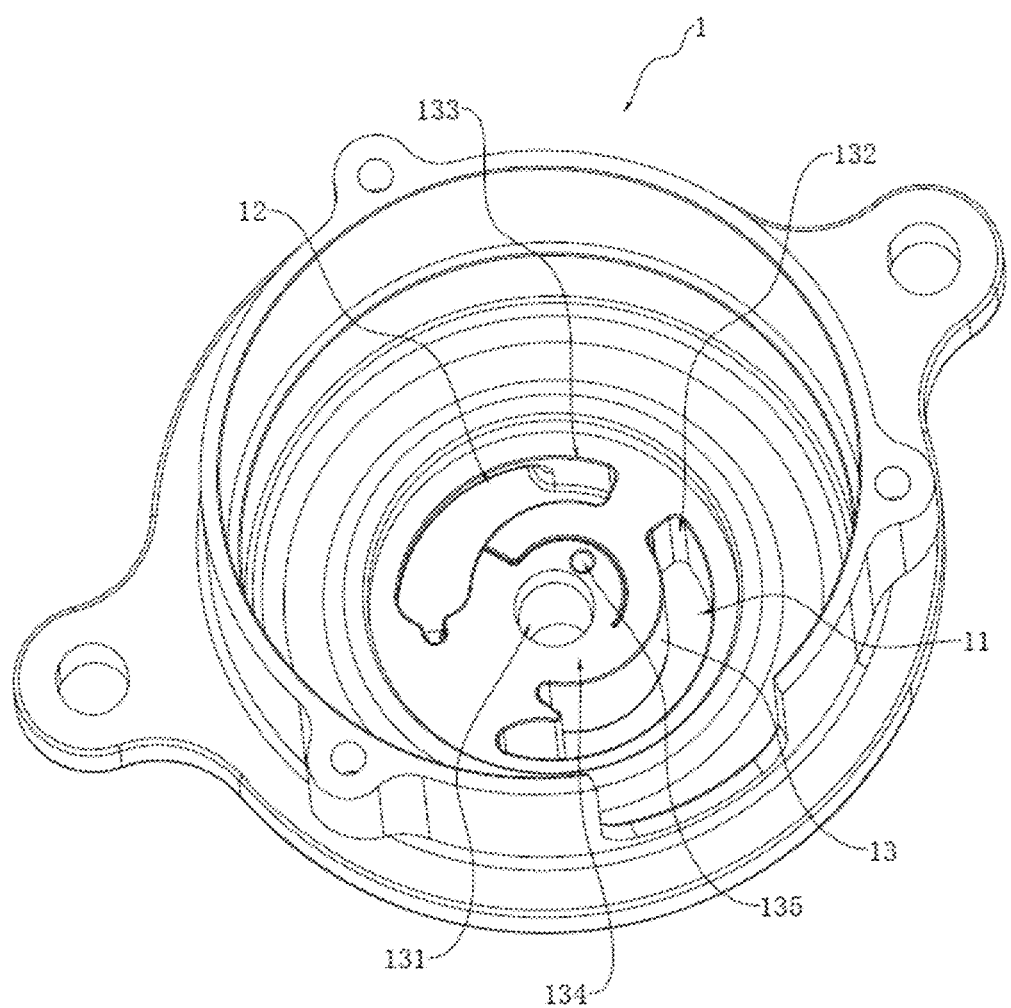
FIG. 9 is a schematic structural diagram of the bottom of the pump housing of the electric oil pump according to the second embodiment of the present application.
Figure 10:
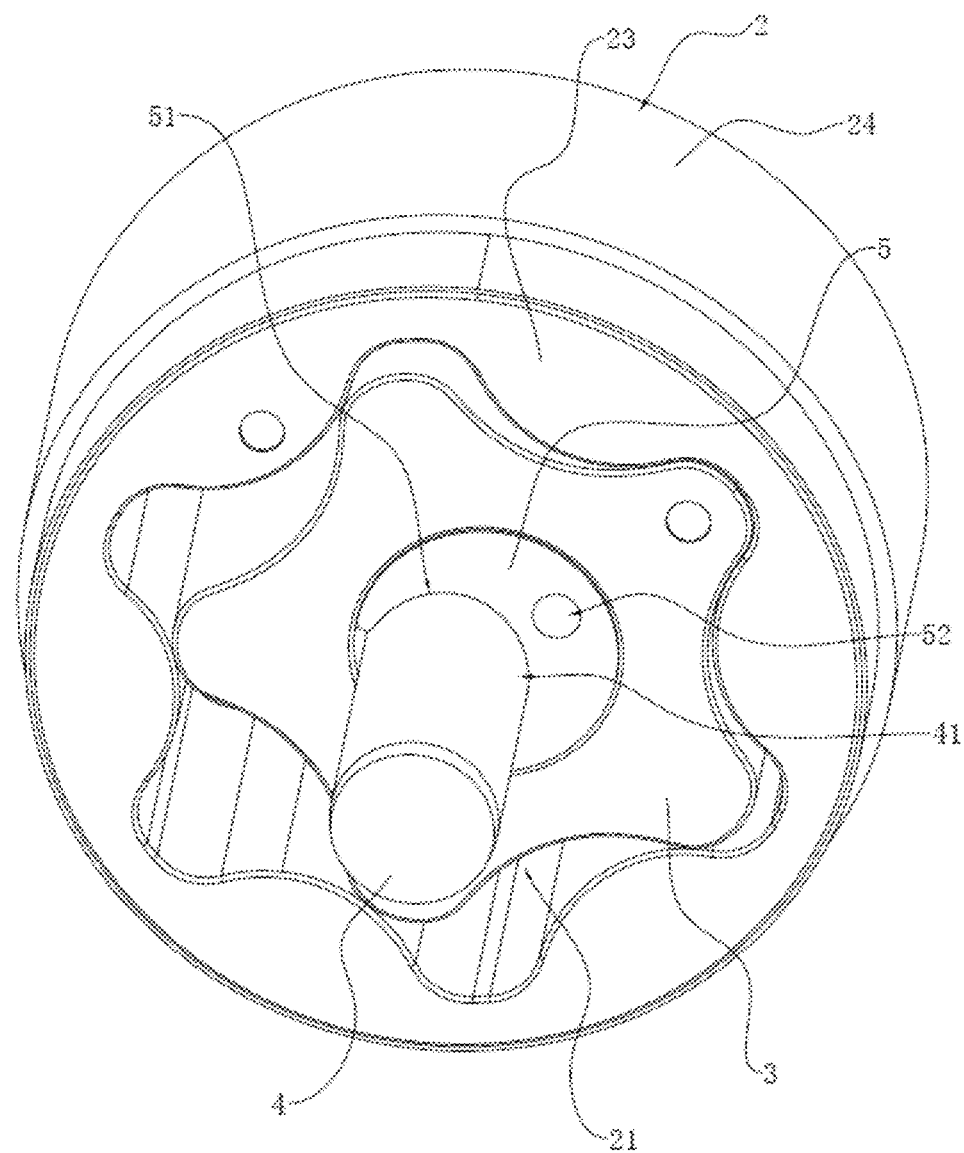
FIG. 10 is a schematic structural diagram of the outer gear and the inner gear in the electric oil pump according to the second embodiment of the present application.
Figure 11:
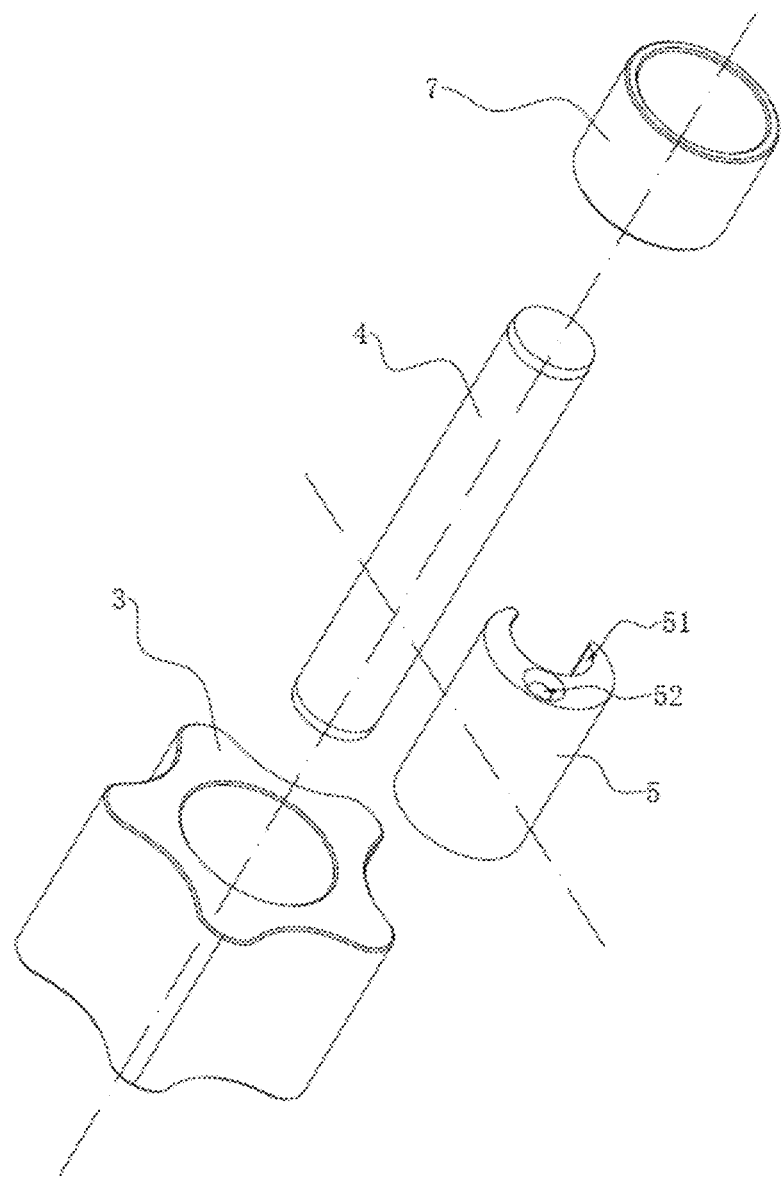
FIG. 11 is a schematic diagram showing an eccentric calibrator in an integrated electric oil pump according to the second embodiment of the present application.

Referring to FIGS. 9-11, an inner circumferential wall of the outer gear 23 and an outer circumferential wall of the inner gear 3 are both attached to an inner end face of the outer circumference of the motor rotor 24. A zone between the outer gear 2 and the inner gear 3 is divided by tooth-to-tooth contact to form multiple closed intake-expulsion chambers 21, the volume of which gradually increases and then decreases along a rotation direction of the outer gear 2. A bottom of pump housing 1 is integrally formed with an inlet 11, and an outer circumferential wall of the pump housing 1 is integrally formed with an outlet 12. When the intake-expulsion chamber 21 gradually increases, it is aligned with the inlet 11. When the intake-expulsion chamber 21 gradually decreases, it is aligned with the outlet 12.

The bottom of pump housing 1 is integrally formed with a housing bottom 13 covering the inlet 11 and the outlet 12. An end face of housing bottom 13 is axially defined with a pressing hole 131 fixedly connected to one end of the fixed shaft 4. The fixed shaft 4 is inserted into the pressing hole 131, and an outer circumferential wall of fixed shaft 4 is tightly fit with the hole wall of the pressing hole 131. An end face of the housing bottom 13 is defined with an intake mouth 132 communicating with the inlet 11 and an expulsion mouth 133 communicating with the outlet 12. At the housing bottom 13, a partition 134 is formed to separate the intake mouth 132 and the expulsion mouth 133 after the intake mouth 132 and the expulsion mouth 133 are defined. One side of the partition 134 is attached to one side of the inner gear 3, improving the sealing between the intake mouth 132 and the expulsion mouth 133.

A location hole 52 is formed in one side of the crescent sleeve and penetrates through the crescent sleeve, a guide hole for assembly 135 corresponding to the location hole 52 is formed in the housing bottom 13, the guide hole for assembly 135 and the pressing hole 131 are arranged eccentrically. A bushing is provided between the fixed shaft 4 and the inner gear 3, to reduce sliding friction. The inner gear 3 is rotatably connected to the crescent sleeve and the fixed shaft 4 via the bushing 7.

An opening is formed in the pump housing 1 to match the fixed shaft 4, thereby effectively reducing the machining complexity of the pump housing 1, improving the machining efficiency of the pump housing 1, and improving the matching accuracy between the outer gear 2 and the inner gear 3.

The implementation principle of the high-precision electric oil pump in this embodiment of the present application is stated as follows.

A fixed shaft 4 is provided in the pump housing 1, and then an eccentric calibrator 5 is provided on the circumferential side wall of the fixed shaft 4 to form an eccentric assembly 41. In this way, when the outer gear 2 is rotatably connected to the fixed shaft 4, the eccentric assembly 41 may also be rotatably connected to the inner gear 3, thus achieving the relative coaxial and eccentric arrangement of the inner gear 3 relative to the outer gear 2.

The Third Embodiment

Figure 12:
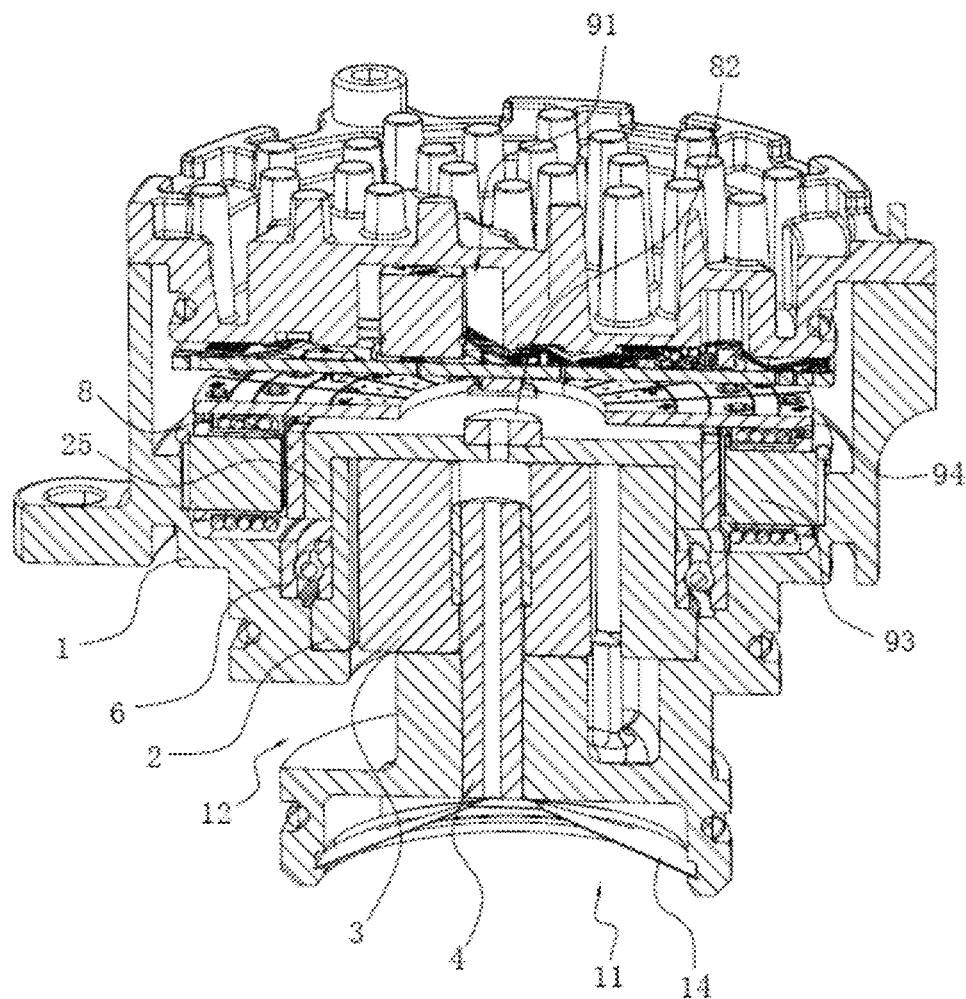
FIG. 12 is a schematic three-dimensional section view of the electric oil pump according to the third embodiment of the present application.

Referring to FIG. 12, this embodiment differs from the first embodiment and the second embodiment in that the bearing is provided between the outer gear and the pump housing, and the fixed shaft 4 has a hollow structure. In this embodiment, a channel for cooling oil to pass through is defined inside the fixed shaft 4. In this embodiment, the fixed shaft 4 is designed to be stationary. Under the drive of the outer gear 2, the inner gear 3 in the pump rotates relative to the fixed shaft 4, and the mutual lubrication therebetween reduces friction, so as to reduce the loss of the gerotor system, and effectively improve the rotation stability of the gerotor.

The mechanism for cooling the stator assembly by the cooling oil in this embodiment is as follows.

The motor rotor 8 and the outer gear 2 jointly drive the inner gear 3 to rotate to pressurize the cooling oil from the inlet 11, so that one part of the pressurized cooling oil flows to the stator assembly via the hollow channel of the fixed shaft 4, to cool the stator assembly, and the cooling oil that undergoes heat exchange then flows back to a low-pressure area.

In addition, the other part of the pressurized cooling oil is directly discharged from the outlet 12 via a high-pressure area.

In this embodiment, the fixed shaft 4 is further equipped with a radial magnetic steel to monitor the position of the fixed shaft.

The specific process of cooling the stator assembly of the present application is as follows.

1) First, the device is powered on. At this time, the controller 91 is powered on and converts electricity into three-phase electricity to power the stator windings 94. The electromagnetic force drives the motor rotor 8 and the outer gear 2 to rotate. The motor rotor 8 and the outer gear 2 rotate so that the cooling oil from the inlet 11 enters the low-pressure area through the filter screen 14.

2) The motor rotor 8 and the outer gear 2 jointly drive the inner gear 3 to rotate around the fixed shaft 4, to pressurize the cooling oil from the inlet 11, so that one part of the pressurized cooling oil flows to the stator assembly through the fixed shaft 4, to cool the stator assembly, the cooling oil that undergoes heat exchange then flows back to the low-pressure area, and the cooling oil is pressurized by a pressure difference caused by the eccentric arrangement of the inner gear relative to the outer gear. In this case, the PTC temperature sensor 82 is configured to detect the current temperature value of the oil and feed the temperature value back to the controller 91, and the controller 91 then feeds the current temperature value of the oil back to an external control system.

3) The other part of the pressurized cooling oil is directly discharged from the outlet 12 through the high-pressure area.

The above shows and describes the basic principles, main features and advantages of the present invention. Those skilled in the industry should understand that the present application is not limited by the embodiments described above. The described embodiments and description only illustrate the principles of the present application. Without departing from the spirit and scope of the present disclosure, the present application may also be subject to various changes, modifications, substitutions and variations, all of which fall within the scope of the present disclosure as claimed.

LIST OF REFERENCE NUMERALS

1 Pump Housing
11 Inlet
12 Outlet
13 Bottom Of Pump Housing
131 Pressing Hole
132 Intake Mouth
133 Expulsion Mouth
134 Partition
135 Guide Hole For Assembly
14 Filter Screen
15 Enclosure
16 Air Gap
17 Sealing Ring
2 Outer Gear
21 Intake And Outtake Chamber For Oil
22 Rotor Neck
23 Inner Circumference Of Outer Gear
24 Outer Circumference Of Motor Rotor
25 Upper Cover
26 Sensor
3 Inner Gear
4 Fixed Shaft
41 Eccentric Assembly
5 Eccentric Calibrator
51 curved notch
52 Location Hole
6 Bearing
7 Bushing
8 Motor Rotor
9 Circuit Control Module
91 Controller
92 busbar hub
93 Motor Stator
94 Stator Winding

What is claimed is:

1. An electric oil pump, comprising:
a pump housing,
a fixed shaft in the pump housing,
an inner gear, the inner gear is eccentrically and rotationally connected to the fixed shaft,
an outer gear, the outer gear is coaxially connected to the fixed shaft and rotatably arranged in the pump housing, the outer gear is located at an outer periphery of the inner gear and meshed with the inner gear,
a motor rotor, the motor rotor is fixedly connected to an outer periphery of the outer gear,
a motor stator at an outer periphery of the motor rotor, the motor stator is fixedly connected to the pump housing,
a bearing, wherein an outer circle of the motor rotor is integrally formed with a neck to match with the bearing, the outer gear is rotationally connected to a first end of the fixed shaft by virtue of the bearing, and a second end of the fixed shaft is connected to the pump housing, wherein an oil outlet is formed in a side wall of the pump housing, and an oil inlet is defined at a bottom of the pump housing.

2. The electric oil pump according to claim 1, further comprising an eccentric calibration component between the fixed shaft and the inner gear, wherein the eccentric calibration component is configured as a semilunar sleeve on a circumferential outer wall of the fixed shaft, the semilunar sleeve is configured with an arc-shaped groove for the fixed shaft to be embedded, and the semilunar sleeve is configured to allow the inner gear to be eccentrically and rotationally connected to the fixed shaft.

3. The electric oil pump according to claim 2, further comprising a shaft sleeve, wherein the inner gear is rotationally connected to the semilunar sleeve and the fixed shaft by virtue of the shaft sleeve.

4. The electric oil pump according to claim 1, wherein the fixed shaft or the outer gear is fixedly connected with a sensor configured for cold start.

5. The electric oil pump according to claim 1, wherein a plurality of intake and outtake chambers for oil are formed between the outer gear and the inner gear, volume of the plurality of intake and outtake chambers for oil first increases step by step and then decreases step by step along a rotation direction of the outer gear, when the volume of the plurality of intake and outtake chambers for oil increases step by step, an oil entrance of the plurality of intake and outtake chambers for oil is aligned with the oil inlet, and when the volume of the plurality of intake and outtake chambers for oil decreases step by step, an oil exit of the plurality of intake and outtake chambers for oil is aligned with the oil outlet.

6. The electric oil pump according to claim 5, wherein when the volume of the plurality of intake and outtake chambers for oil increases step by step, cooling oil flows into the plurality of intake and outtake chambers for oil through the oil inlet, and when the volume of the plurality of intake and outtake chambers for oil decreases step by step, the cooling oil in the plurality of intake and outtake chambers for oil is pressurized and discharged from the oil outlet.

7. The electric oil pump according to claim 1, further comprising a circuit control module, wherein the circuit control module comprises a controller and a hub, the controller and the hub are arranged in the pump housing, the motor stator is arranged on the hub, the motor stator is provided with a plurality of stator windings along a circumferential direction of the motor stator, the motor rotor is fitted on a circumferential outer circle of the outer gear, and a circumferential outer wall of the motor rotor is opposite a circumferential inner wall of the motor stator.

8. The electric oil pump according to claim 7, wherein an O-ring is provided at an outer periphery of the pump housing.

9. An electric oil pump, comprising:
a pump housing,
a fixed shaft in the pump housing,
an inner gear, the inner gear is eccentrically and rotationally connected to the fixed shaft,
an outer gear, the outer gear is coaxially connected to the fixed shaft and rotatably arranged in the pump housing, the outer gear is located at an outer periphery of the inner gear and meshed with the inner gear,
a motor rotor, the motor rotor is fixedly connected to an outer periphery of the outer gear,
a motor stator at an outer periphery of the motor rotor, the motor stator is fixedly connected to the pump housing,
an upper cover fixedly connected to the outer gear, and
a bearing, wherein a second end of the fixed shaft is rotationally connected to the pump housing by virtue of the bearing, a first end of the fixed shaft is coaxially connected to the outer gear through the upper cover,
wherein an oil outlet is formed in a side wall of the pump housing, and an oil inlet is defined at a bottom of the pump housing.

10. The electric oil pump according to claim 9, wherein a plurality of intake and outtake chambers for oil are formed between the outer gear and the inner gear, volume of the plurality of intake and outtake chambers for oil first increases step by step and then decreases step by step along a rotation direction of the outer gear, when the volume of the plurality of intake and outtake chambers for oil increases step by step, an oil entrance of the plurality of intake and outtake chambers for oil is aligned with the oil inlet, and when the volume of the plurality of intake and outtake chambers for oil decreases step by step, an oil exit of the plurality of intake and outtake chambers for oil is aligned with the oil outlet.

11. The electric oil pump according to claim 10, wherein when the volume of the plurality of intake and outtake chambers for oil increases step by step, cooling oil flows into the plurality of intake and outtake chambers for oil through the oil inlet, and when the volume of the plurality of intake and outtake chambers for oil decreases step by step, the cooling oil in the plurality of intake and outtake chambers for oil is pressurized and discharged from the oil outlet.

\* \* \* \* \*